US006928794B2

(12) United States Patent
Hamer et al.

(10) Patent No.: US 6,928,794 B2
(45) Date of Patent: Aug. 16, 2005

(54) METHOD AND APPARATUS FOR MAKING A CONTINUOUS SERIES OF FILLED POUCHES

(75) Inventors: Craig E. Hamer, Woodbury, MN (US); John F. Macklin, Lakeville, MN (US); Gary W. Schukar, North Oaks, MN (US); Jeffery N. Jackson, Woodbury, MN (US); Neil J. Schwartzbauer, Hastings, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/632,611

(22) Filed: Aug. 1, 2003

(65) Prior Publication Data

US 2005/0022476 A1 Feb. 3, 2005

(51) Int. Cl.[7] .................................................. B65B 9/04
(52) U.S. Cl. .............................. 53/450; 53/467; 53/477; 53/551; 53/553; 53/555
(58) Field of Search ........................... 53/449–452, 467, 53/477, 550–555; 156/69, 327

(56) References Cited

U.S. PATENT DOCUMENTS

| | | | | |
|---|---|---|---|---|
| 2,738,631 A | * | 3/1956 | Jarund | 53/551 |
| 3,001,348 A | * | 9/1961 | Pickering | 53/550 |
| 3,210,908 A | * | 10/1965 | Samberg | 53/546 |
| 3,300,944 A | * | 1/1967 | Thesing | 53/451 |
| 3,560,312 A | | 2/1971 | Smith | |
| 3,850,780 A | | 11/1974 | Crawford et al. | |
| 4,529,472 A | | 7/1985 | Hsu | |
| 4,637,199 A | * | 1/1987 | Steck et al. | 53/451 |
| 4,706,439 A | * | 11/1987 | Barton | 53/413 |
| 4,947,618 A | | 8/1990 | Schneider et al. | |
| 5,001,891 A | * | 3/1991 | Abate | 53/551 |
| 5,031,386 A | | 7/1991 | Schneider | |
| 5,182,128 A | * | 1/1993 | Laplace | 426/410 |
| 5,870,887 A | | 2/1999 | Bennett | |
| 6,006,503 A | * | 12/1999 | Davison et al. | 53/551 |
| 6,035,604 A | * | 3/2000 | Gustafsson | 53/64 |
| 6,035,615 A | * | 3/2000 | Hansson et al. | 53/551 |
| 6,038,838 A | * | 3/2000 | Fontanazzi | 53/551 |
| 6,367,230 B1 | | 4/2002 | Fukuda | |
| 6,761,016 B1 | * | 7/2004 | Soleri | 53/554 |

FOREIGN PATENT DOCUMENTS

| | | |
|---|---|---|
| DE | 29914977 U | 2/2000 |
| EP | 0 710 538 B1 | 6/1998 |
| EP | 0950607 A | 10/1999 |
| EP | 1 018 470 B1 | 7/2000 |
| EP | 1 038 779 A1 | 9/2000 |
| EP | 1092631 A | 4/2001 |
| FR | 1387570 A | 1/1965 |
| JP | 2002104310 A | 4/2002 |
| WO | WO 0202403 A | 1/2002 |

OTHER PUBLICATIONS

Product Literature, Cloud LLC, Des Plaines, IL, USA, pp 2.

* cited by examiner

*Primary Examiner*—Louis K. Huynh
*Assistant Examiner*—Hemant M. Desai
(74) *Attorney, Agent, or Firm*—David B. Patchett

(57) ABSTRACT

A machine for forming filled sealed pouches from a continuously moving sealable web of material includes a first sealing station for forming a longitudinal seal along a side edge of the web, and a horizontal sealing station for forming a plurality of transverse seals in the web. The horizontal sealing station includes a pair of conveyors each carrying jaws that mate along a sealing path to form the transverse seals. A method of forming filled sealed pouches from a continuously moving sealable web of material is also described.

7 Claims, 5 Drawing Sheets

METHOD AND APPARATUS FOR MAKING A CONTINUOUS SERIES OF FILLED POUCHES

FIELD OF THE INVENTION

The present invention relates generally to forming, filling, and sealing pouches and, more particularly, to a method and apparatus for taking a sealable web of material and sealing the web to form a continuous series of discrete filled pouches.

BACKGROUND OF THE INVENTION

Packaging equipment for forming, filling, and sealing pouches is used in the production of a wide variety of products including foods products, beverages, health care products, and cleaning products, and such packaging equipment is known in the prior art.

The Bennett (U.S. Pat. No. 5,870,887), for example, discloses a form-fill-seal packaging machine in which a packaging material is sealed crosswise by bringing a pair of sealing jaws into contact with each other. The sealing jaws are caused to follow the packaging material along the packaging material transfer direction while they are kept in the same condition, to cause the sealing jaws to take contacting and following motions by means of a single drive source. The rotation of a motor is converted into a linear reciprocating motion along the transfer route of the packaging material through a cam mechanism comprised of a circular cam plate and an arm, and the converted reciprocating motion is transmitted to a block.

The industry, however, is always seeking improved pouching equipment that is more reliable, easier to maintain, and operates at higher speeds.

SUMMARY OF THE INVENTION

The present invention provides a method and apparatus for producing filled sealed pouches from a continuously moving elongate sealable web of material. In one aspect, the present invention provides a method of creating pouches from a continuously moving elongate sealable web including opposed sheets each having first and second side edges, wherein the method comprises the steps of longitudinally sealing the web along at least one side edge, providing a pair of cooperating conveyors defining a sealing path between the conveyors, the conveyors including at least one pair of cooperating mating jaws traveling at substantially the same velocity as the web, and forming a plurality of transverse seals in the web by engaging the web between a pair of mating jaws along at least a portion of the sealing path to bond the two opposed sheets along an interface.

In one embodiment, at least one of the conveyors is flexible and travels over a non-circular path. Each conveyor includes one or more jaws. In a particular embodiment, at least two pairs of mating jaws engage the web along the sealing path simultaneously. In a preferred embodiment, the web includes a heat sealable layer, and heat is applied to the web along at least a portion of the sealing path.

In one embodiment the sealing path is planar, and in another embodiment, the sealing path is arcuate.

In another aspect, the method of the present invention further comprises filling a partially formed pouch with a liquid after the formation of a longitudinal seal along the side edge of the web and after the formation of at least one transverse seal forming the bottom of the pouch. In a particular aspect, the web is an unsupported thermoplastic web that is sealed using impulse heat, and the pouch is filled with a liquid reactive monomer mixture comprising a monomer and, optionally, an initiator.

In another aspect, the web is a supported web. The web may comprise a single folded sheet of material or two individual sheets of material.

In a preferred embodiment, the web travels at a generally constant velocity, and the jaws travel at substantially the same velocity as the web.

In another aspect, the present invention provides a method of creating pouches from a continuously moving elongate sealable web including opposed sheets each having first and second side edges, wherein the method comprises the steps of longitudinally sealing the web along at least one side edge, providing first and second jaw carrying members defining a sealing path therebetween, the jaw carrying members including a plurality of cooperating pairs of mating jaws traveling at substantially the same velocity as the web along the sealing path, and forming a plurality of transverse seals in the web as the web travels along the sealing path by applying heat and/or pressure to the web between a pair of mating jaws, thereby bonding the sheets, wherein at least one of the jaw carrying members comprises a flexible non-circular conveyor. In another embodiment, the other jaw carrying member comprises a cylindrical drum carrying a plurality of jaws.

In another aspect, the present invention provides an apparatus for creating pouches from a continuously moving elongate sealable web including opposed sheets each having first and second side edges, the apparatus comprising a first sealing station arranged to form a longitudinal seal along at least one side edge of the web, thereby to seal the edge, and a second sealing station arranged to form a plurality of transverse seals in the web, the second sealing station including opposed conveyors defining a sealing path between the conveyors, the conveyors including at least one pair of cooperating mating jaws arranged to engage opposite side surfaces of the web along the sealing path.

In one aspect, the conveyors and the associated jaws travel along the same endless non-circular path while each conveyor assembly remains stationary in a fixed position relative to the other conveyor assembly and relative to the moving web of material. That is, the conveyors move along the defined endless path of travel but are not otherwise reciprocated, translated, or moved relative to each other, the web, or the frame of the machine.

In a specific aspect, at least one of the conveyors of the apparatus is flexible and has a non-circular path of travel. In another specific aspect, each conveyor of the apparatus includes a plurality of jaws that cooperate with the jaws on the other conveyor to form mating pairs of jaws. In an even more specific aspect, the apparatus further includes at least one fill tube arranged to inject a liquid into the pouches after the formation of at least one transverse seal defining the bottom of a pouch and before the formation of the transverse seal defining the top of the pouch.

Because the web does not stop during the formation of the pouches, the present invention provides a continuous motion process in which the web, conveyor, and other components are not repeatedly started, stopped, and re-started. In addition, the conveyors move along the same defined paths but are fixed relative to each other and relative to the moving web of material. That is, the conveyor assemblies are fixed to the frame of the machine and no reciprocating or translational motion is provided to the conveyors. Consequently, wear and tear on the machine is significantly reduced, and the reliability and life of the equipment is improved. In addition, because the web is moving continuously, overall production rates are improved.

In addition, because the jaws are attached to and driven by a conveyor, they travel at substantially constant speeds, thereby eliminating the need for speed compensation. Another advantage of the present invention is that multiple sets of engaged jaws may be provided along the sealing path simultaneously, thereby allowing sufficient engagement time of the jaws to form a suitable bonds joining opposing webs, and resulting in increased throughput rates. The present invention also provides independent draw control of the web throughout the process which results in excellent web handling and minimal stress on the seals.

In addition, because the present invention is a continuous motion process, the need for split second timing in controlling and synchronizing the various components is greatly reduced. As a result, reliance on air cylinders for process motion control is eliminated. The present invention also provides for increased engagement time of the mating jaws during the formation of the transverse seal. For example, for a given conveyor path length, the machine is able to readily achieve a sealing path length that is greater than 25% of the conveyor path length. It will be recognized that, at least in theory, one could approach a sealing path length of 50% of the conveyor path length. This results in better control of web stress in the sealing process. In addition, the jaws are individually removable, thereby allowing spare jaws to be built and kept on hand so that, if a jaw is to be replaced as part of a repair or routine maintenance, down time is kept to a minimum. Providing individually removable jaws also allows for quick changeover to accommodate different size pouches or to change the geometry of the transverse seal.

BRIEF DESCRIPTION OF THE DRAWINGS

The present invention will be further described with reference to the accompanying drawings, in which:

FIG. 3b is a sectional view taken along line 3b—3b of FIG. 3a;

FIG. 3c is a sectional view taken along line 3c—3c of FIG. 3a;

DETAILED DESCRIPTION

Figure 4:
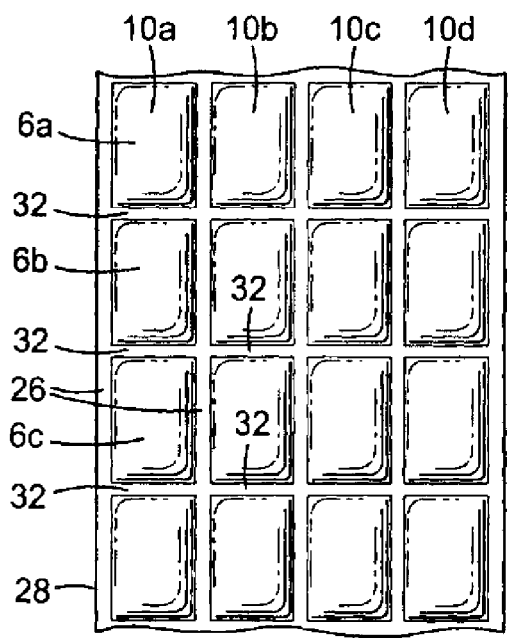
FIG. 4 is a plan view of a grid of pouches formed by the machine of FIG. 1.

Referring now to the drawings, wherein like reference numerals refer to like or corresponding parts throughout the several views, FIGS. 1–6 show a machine 2 for producing a continuous series 6 or a grid 8 of discrete sealed pouches 6a–c from a web 4 of material. As shown in FIGS. 3a–c, a series 6 of pouches consists of single lane of aligned individually connected pouches 6a–c, and as shown in FIG. 4, a grid 8 of pouches consists of two or more parallel series 10a–d of pouches.

Figure 1:
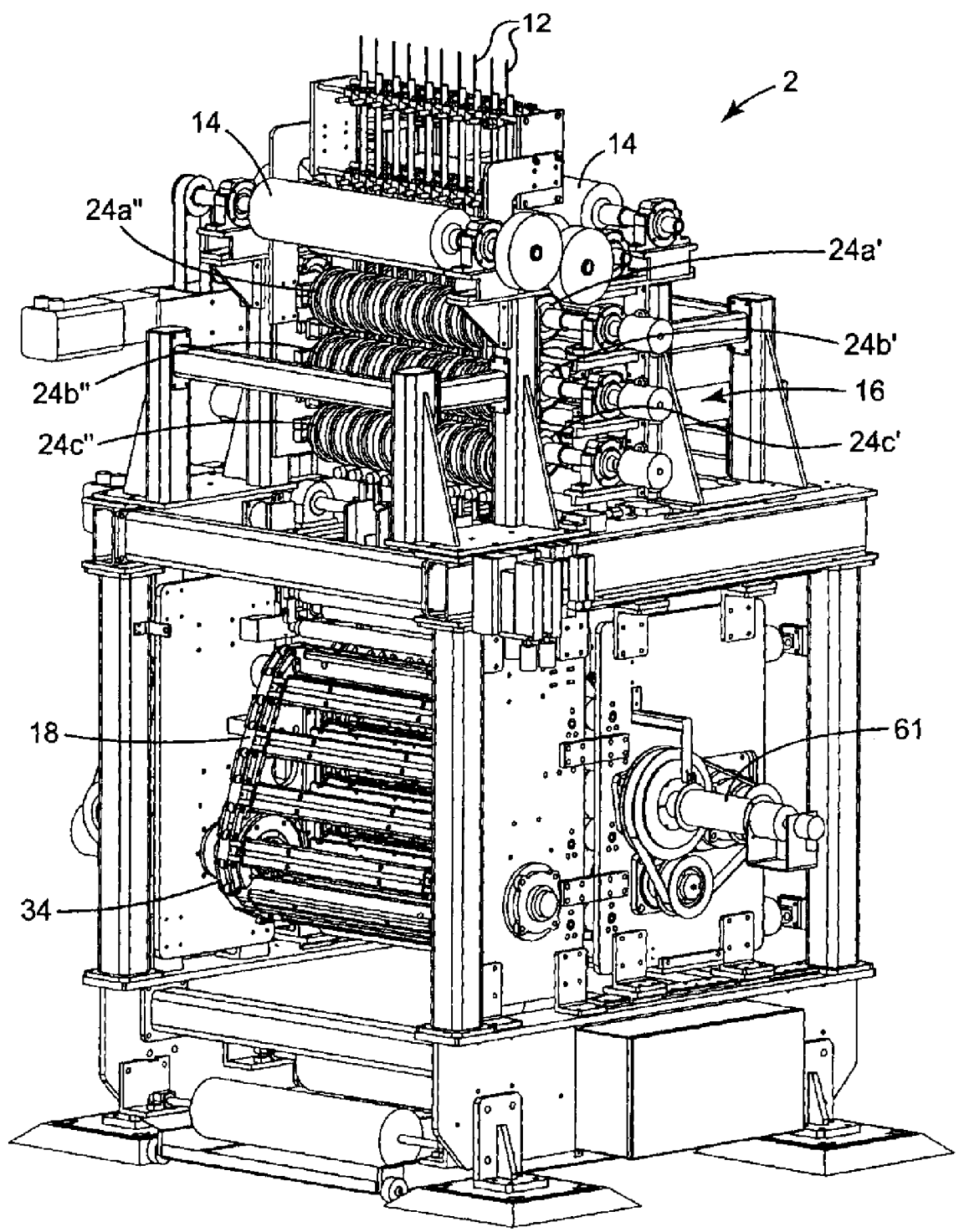
FIG. 1 is a perspective view of a pouch forming machine according to the invention.
Figure 2:
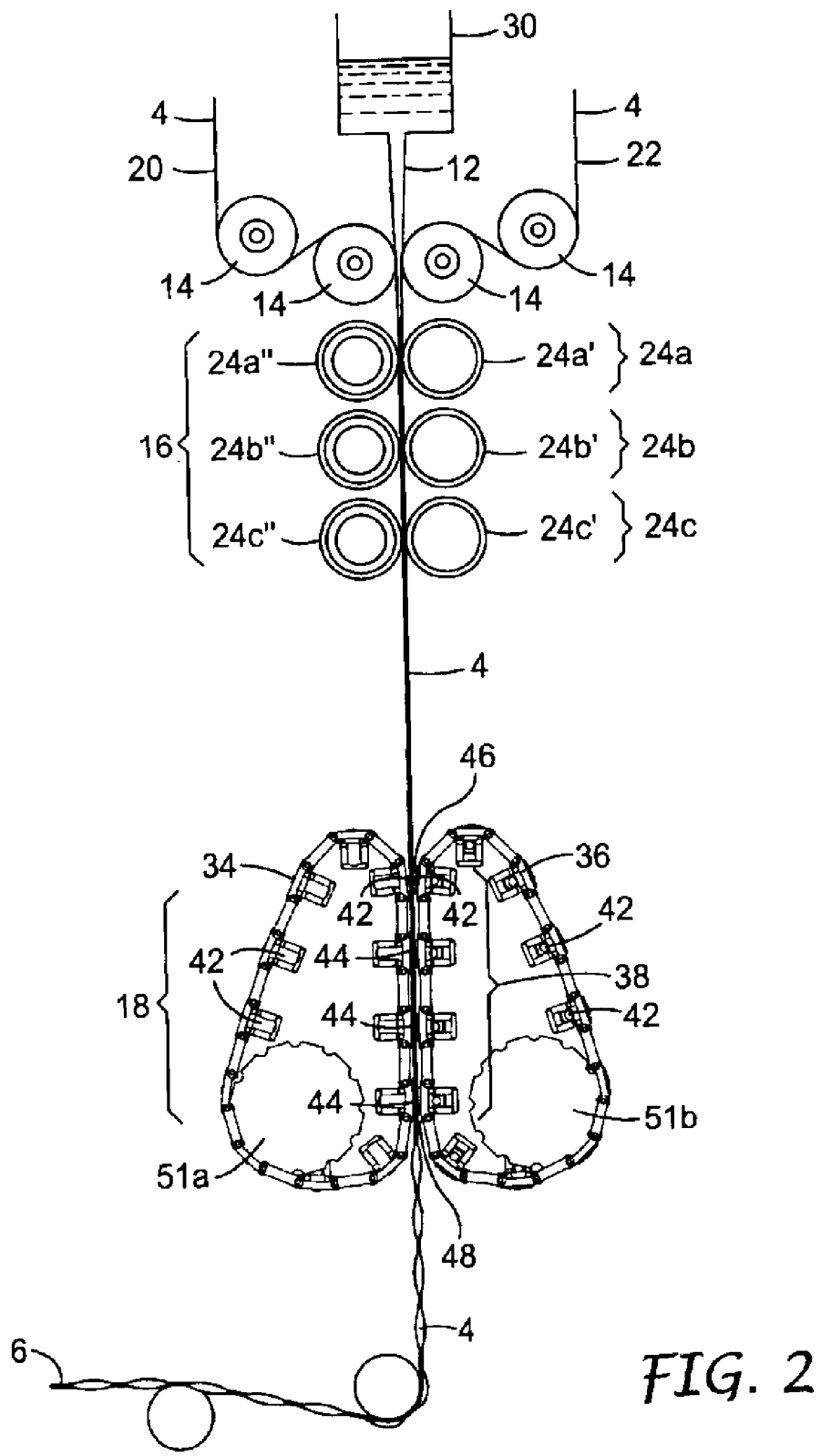
FIG. 2 is a diagrammatic illustration of the invention.
Figure 3A:
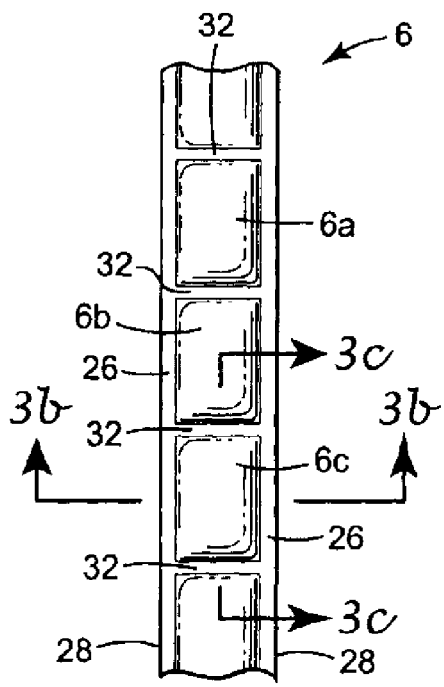
FIG. 3a is a plan view of a series of pouches formed by the machine of FIG. 1.
Figure 3B:
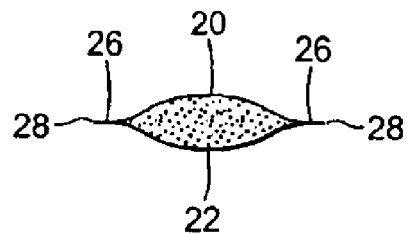
Figure 3C:
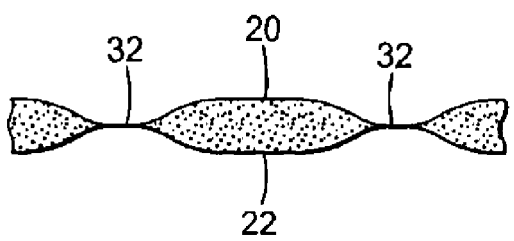

As shown in FIGS. 1 and 2, the machine 2 includes fill tubes 12, unwind tension isolation pull rolls 14, a vertical sealing station 16, and a horizontal sealing station 18. The machine is particularly suited for making liquid filled pouches such as pouches filled with a liquid monomer mixture that can be polymerized to form an adhesive. The machine may also be used, however, for general purpose packaging, and may be used to produce sealed pouches containing a wide variety of materials including fluids, powders, and/or discrete items. Examples include forming air filled pouches to produce, for example, bubble wrap, packaging food, packaging consumer items such as hardware, detergent, shampoo, or packaging medical devices or electrical components.

The web 4 preferably comprises two separate sheets 20, 22 of a heat sealable film. Alternatively, the web 4 may comprises a single folded sheet of film. The particular film is not significant to the invention hereof, so long as it can be sealed and otherwise exhibits the desired properties for the particular application. Suitable films include films formed of thermoplastic materials such as polyethylene, and ethylene copolymers such as polyolefins and derivatives of these including ethylene vinyl acetate (EVA), ethylene methyl acrylate (EMA), ethylene acrylic acid (EAA), EAA ionomers, and polypropylene, and other thermoplastic materials such as acrylics, polyphenylene ether, polyphenylene sulfide, acrylonitrile-butadiene-styrene copolymer (ABS), polyurethanes, and others know to those skilled in the art. Blends of thermoplastic materials may also be used. Preferred films are polyethylene and EVA. The films may optionally contain additives such as fibers, fire retardants, antiblock agents, thermally conductive particles, electrically conductive particles, antistatic agents, fillers, antioxidants, stabilizers, plasticizers, dyes, perfumes, slip agents, microwave susceptors, and/or other materials to increase the flexibility, handleability, visibility, or other useful property of the film.

The web may be either supported or unsupported. Supported webs have a multi-layer construction including a sealing layer, such as a thermoplastic film, and further including a support layer that remains stable at sealing temperatures, such as a layer of treated or untreated paper, fabric, nonwoven material, polyester, or metal such as aluminum foil. The support layer may be porous or nonporous. Supported films offer increased durability and are desirable for use in liquid fill applications due to their barrier properties for oxygen permeation and liquid diffusion. Unsupported webs comprise one or more layers of heat sealable thermoplastic polymers such as those discussed above.

Heat sealing the webs may be accomplished using resistance heat sealing, which uses a hot metal bar that remains hot throughout the bonding cycle, or impulse heat sealing, which uses an electrically resistive wire or band that cycles between hot and cold throughout the bonding cycle. With impulse heating, the wire is heated to a high enough temperature and for a long enough period of time to form a bond between the two web layers along an interface. The wire is then allowed to cool while the jaws remain engaged to allow the bonded thermoplastic to cool and form a stable seal joining the two webs. If resistance heat sealing is employed with unsupported films, the film will melt during the formation of the transverse seals and the web may be inadvertently cut where a seal was intended. Thus, impulse heat sealing is typically used to seal unsupported webs to prevent cutting the web. It will be recognized that other sealing means may be employed including the use of adhesives, ultrasonic welding, hot air impingement, mechanical attachment means such as crimping, and combinations thereof.

In a particular application of the invention, the machine is used in the production of adhesive. The machine 2 produces a continuous series 6 or grid 8 of pouches filled with a reactive monomer mixture. The pouches are formed from an unsupported web which is sealed using impulse heating. One advantage of using an unsupported web is that the web itself may be blended with the contents of the pouch in a downstream processing step which may be desirable in the production of certain adhesives.

The web 4 enters the machine 2 on two rubber coated unwind tension isolation pull rolls 14 that isolate the tension of the upstream web and thereby allow the tension inside the machine to be controlled. The rolls 14 are run in draw mode relative to the horizontal sealing station 18 (i.e. the rolls 14 are run at a constant speed ratio relative to the conveyors 34, 36) to isolate the unwind tension, improve web handling, and set the relative web length for a web as it enters the sealing path 38.

The web 4 then enters the vertical sealing station 16. The vertical sealing station 16 includes three pairs of sealing rolls 24a–c (FIG. 2) that form vertical (i.e. longitudinal) seals 26 (FIGS. 3 and 4) along each edge of the web 4, thereby forming the sides 28 of the pouches. Each pair of rolls 24a–c consists of a driven, temperature-controlled, steel roll 24a'–c' including annular raised ribs, and a rubber coated idler roll 24a"–c" including matched annular raised ribs. The ribs allow space for the fill tubes 12 to be arranged between the three pairs of sealing rolls 24a–c in the vertical sealing station 16. Each of the driven rolls 24a'–c' is run independently in draw mode relative to the horizontal sealing station 18, thereby improving web handling including seal geometry, web tracking, and web tension.

It will be recognized that other known methods may be used to form the vertical seal such as, for example, an iterative motion walking beam, a resistively heated driven metal band, adhesives, ultrasonic welding, hot air impingement, mechanical attachment means such as crimping, and combinations thereof.

Figure 5:
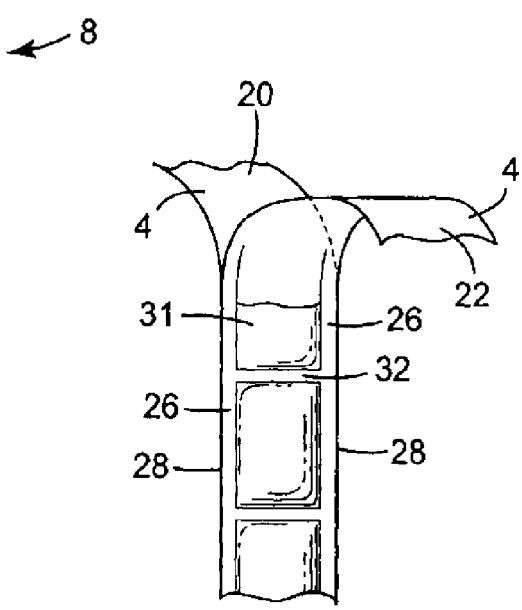
FIG. 5 is a perspective view of a partially sealed web including a partially formed pouch.

Separate liquid fill tubes 12 are provided for each series 10a–d of pouches to convey liquid from a reservoir 30 to the partially sealed pouches 31 (FIG. 5). The partially sealed pouches 31 includes longitudinal edge seals 26 forming the sides 28 of a pouch and a transverse seal 32 forming the top of a filled and fully sealed pouch and the bottom of the next successive partially sealed pouch 31. Each fill tube 12 is provided with a flow meter and control valve to ensure consistent and controlled flow of liquid into each partially sealed pouch 31. The liquid is supplied to the partially sealed pouch 31 after the unwind pull rolls 14 and after the vertical sealing station 16.

In accordance with a characterizing feature of the invention, the machine 2 includes a horizontal sealing station 18 including a sealing path 38 wherein transverse seals 32, which define the ends of each pouch 6a–c, are formed in the web 4. The transverse seal 32 may be, for example, horizontal, diagonal, arcuate, pointed, serrated, or other geometries. It will be recognized that it may be desirable to form two such transverse seals 32 between adjacent pouches to allow the pouches to be readily separated into individual filled pouches or bags by transversely cutting perforating, or notching the web between the two transverse seals. The horizontal sealing station 18 includes first 34 and second 36 opposed flexible non-circular conveyor assemblies that define a planar sealing path 38 between the conveyors 34, 36. Each conveyor assembly includes a continuous band or chain 55a,b for repeatably transferring or conveying the sealing jaws 42 around a closed path.

The conveyors 34, 36 convey the cooperating pairs of mating jaws 42 at substantially the same velocity as the web 4 at least along the sealing path 38 and preferably along the entire path of the conveyor. The relative velocities of the conveyors are also preferably closely matched to minimize stresses on the web. Depending on the web material, however, some variation from a constant velocity may be tolerated. For example, velocity variations may be tolerated so long as they do not detrimentally effect the integrity of the seals.

In the illustrated embodiment, the conveyor path is defined by a gear 51a,b and side plates 57a,b. Each conveyor 34, 36 carries a plurality of sealing jaws 42 that cooperate to form mating pairs 44 that engage opposite sides surfaces of the web 4 along the sealing path 38. The conveyors 34, 36 and the associated jaws 42 travel along the same endless non-circular path while each conveyor assembly remains stationary in a fixed position relative to the other conveyor assembly relative to the moving web of material. That is, during the operation of the machine, the conveyors 34, 36 move along a defined endless path of travel but are not otherwise reciprocated, translated, or moved relative to each other, the web, or the frame of the machine.

The sealing path 38 is the contiguous boundary between the conveyors 34, 36 that extends from the point of initial engagement 46 between a pair of cooperating jaws 44 to the point of disengagement 48 between a pair of cooperating jaws. Within the sealing path 38, cooperating jaws 44 are engaged and are maintained in mating relation with opposed major surfaces of the web 4. Stated another way, the sealing path 38 is the course along which a mating pair of jaws moves. Along the sealing path 38, a mating pair of jaws is engaged and travels over a distance while in the engaged condition. This is in contrast to machines wherein the jaws merely come into contact but do not travel along a path while in contact, such as a machine that uses two circular rollers in the formation of a seal. It will be recognized that with certain web bonding methods, such as hot air impingement, in which heated air is directed to aligned opposed surfaces of the web, operational engagement does not require actual physical contact of the jaws with the web.

Figure 6:
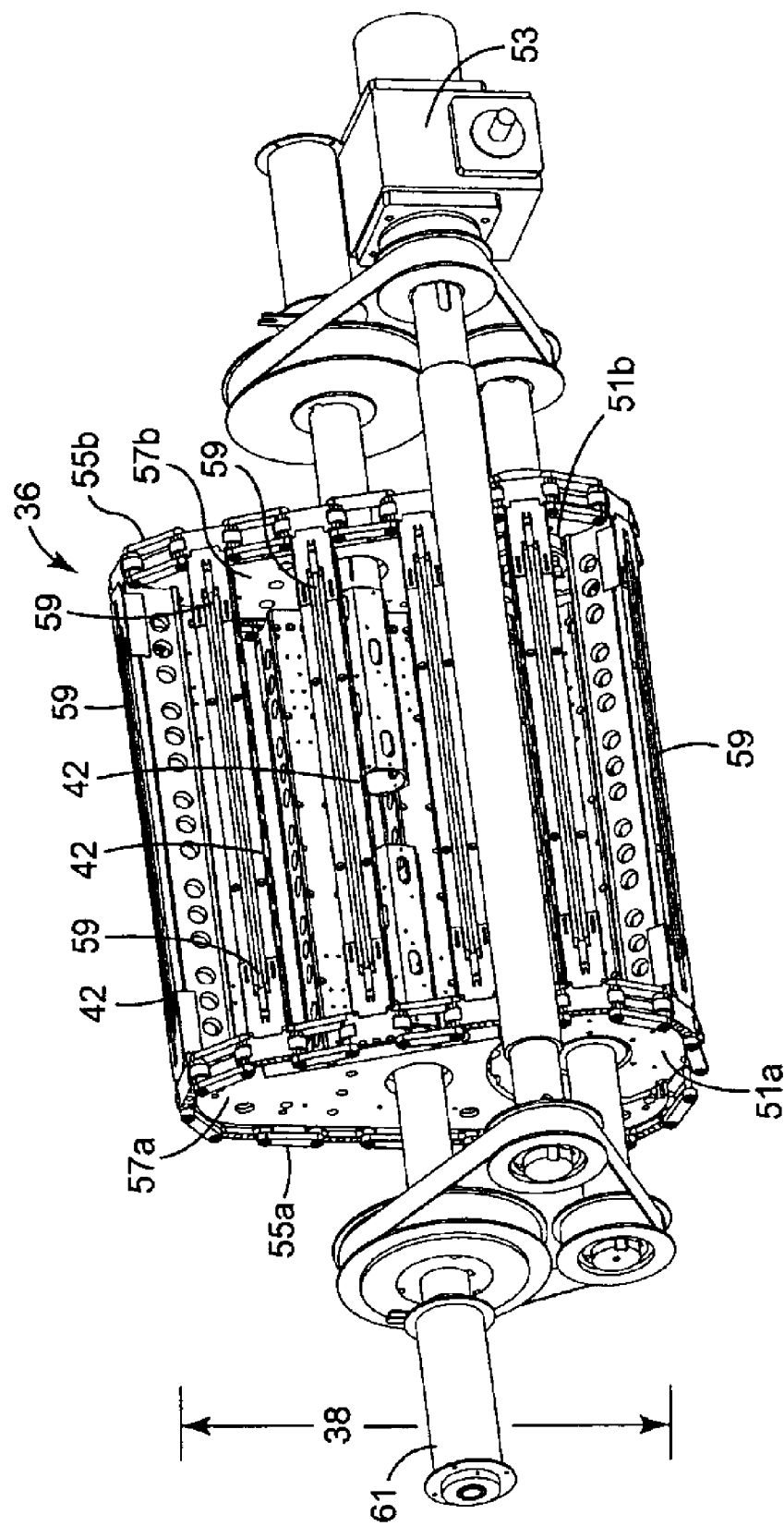
FIG. 6 is a perspective view of the horizontal sealing station.

As shown in FIG. 6, conveyor 36 includes drive gears 51a,b driven by a power transmission system 53. The gears 51a,b are connected with and drive a pair of chains 55a,b, respectively, which define the side profile of the conveyor 36. Mounted on and extending transversely between the chains 55a,b are a plurality of jaws 42. Within the sealing path 38, the chains 55a,b follow and are supported by vertical side plates 57a,b that allow both chains 55a,b and the associated jaws to follow an endless defined path.

Each jaw 42 on conveyor 36 includes an electrically resistive heating element such as a NICHROME impulse sealing element or wire 59 that heats the webs and seals them together, thereby forming the transverse seals 32. The sealing wire 59 cycles between hot and cold along the sealing path 38. With impulse heating, the wire 59 heats up to a high enough temperature and for a long enough period of time to form a bond between the two web layers. The wire 59 then cools while the jaws 42 remain engaged to allow the bonded thermoplastic to cool and form a stable transverse seal 32 between the two webs. The impulse sealing wires 59 are powered by external stationary impulse controllers (not shown). Electrical current is transmitted to each impulse sealing wire 59 via a rotary union 61 consisting of a conventional slip ring assembly. The rotating portion of the slip ring assembly 61 is driven by the same power transmission system 53 that drives gear 51*a*. The second conveyor 34 is similar to the first conveyor 36 except it carries spring-loaded rubber coated jaws that mate with and overlap the heated portion of the impulse sealing wire 59.

It will be recognized that the number of jaws 42 on each conveyor 34, 36 may be varied according to need, and that the number of jaws on each conveyor may be the same or different. In addition, a V-belt, which may include cogs, may be substituted for the chains 55*a,b*.

Figure 7:
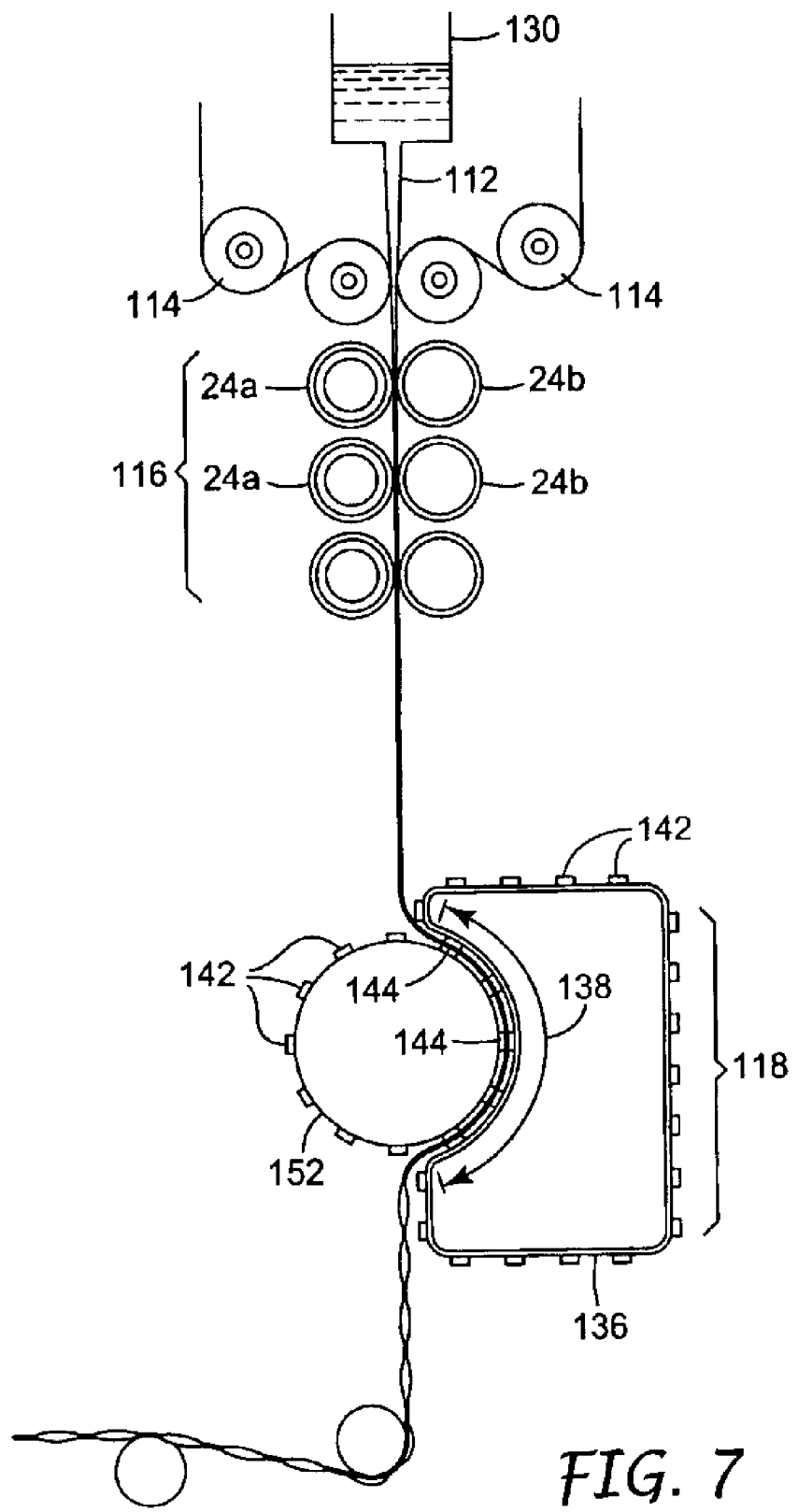
FIG. 7 is a diagrammatic illustration of an alternate embodiment of the invention.

FIG. 7, wherein functionally similar features are referred to with like reference numerals incremented by 100, shows an alternate embodiment of the invention that includes a fill tube 112, unwind tension isolation pull rolls 114, a vertical sealing station 116, and a horizontal sealing station 118. The invention is similar to the invention described with reference to FIG. 2 above except in the horizontal sealing station 118, the first conveyor 34 of FIG. 2 has been replaced with a circular drum 152 carrying a plurality of jaws 142, and the path of the second conveyor 136 has been adapted to match the surface of the drum 152. As a result, the sealing path 138 is arcuate rather than planar.

It will be apparent to those of ordinary skill in the art that various changes and modifications may be made without deviating from the inventive concept set forth above. Thus, the scope of the present invention should not be limited to the structures described in this application, but only by the structures described by the language of the claims and the equivalents of those structures.

What is claimed is:

1. A method of producing a pressure sensitive adhesive, comprising the steps of:
   (a) providing a continuously moving, unsupported, elongate, thermoplastic, heat sealable web, the web including opposed sheets each having first and second side edges;
   (b) longitudinally sealing the web along at least one side edge, thereby forming an elongate tube with sealed side edges;
   (c) providing first and second jaw carrying members defining a sealing path therebetween, the jaw carrying members including a plurality of cooperating pairs of mating jaws traveling at substantially the same velocity as the web along the sealing path, wherein at least one of the jaw carrying members comprises a flexible non-circular conveyor;
   (d) forming a first transverse seal in the web as the web travels along the sealing path by clamping the web between a pair of mating jaws and bonding the sheets by heating the web, thereby forming a partially formed pouch having sealed side edges, a sealed bottom, and an open top;
   (e) filling the partially formed pouch with a polymerizable liquid monomer mixture;
   (f) forming a second transverse seal in the web as the web travels along the sealing path by clamping the web between a pair of mating jaws and bonding the sheets by heating the web, thereby sealing the top of the partially formed pouch;
   (g) polymerizing the liquid monomer mixture; and
   (h) blending the polymerized liquid with the web material, thereby to form the pressure sensitive adhesive.

2. The method defined in claim 1, wherein the longitudinal seal is formed by a vertical sealing station including a plurality of sealing rolls.

3. The method defined in claim 2, wherein the sealing rolls are operated in draw mode, whereby the web is maintained under tension prior to and during the formation of the longitudinal seal.

4. The method defined in claim 3, wherein the web entering the sealing path is relaxed and not under tension during the formation of the transverse seal.

5. The method defined in claim 4, wherein the web material is selected from the group consisting of polyethylene, ethylene copolymers, ethylene vinyl acetate (EVA), ethylene methyl acrylate (EMA), ethylene acrylic acid (EAA), EAA ionomers, polypropylene, acrylics, polyphenylene ether, polyphenylene sulfide, acrylonitrile-butadiene-styrene copolymer (ABS), polyurethanes and mixtures thereof.

6. A method as defined in claim 5, wherein the reactive monomer mixture comprises a monomer and an initiator.

7. The method defined in claim 6, wherein the transverse seals are formed by impulse sealing.

* * * * *